(12) United States Patent
Shaw (10) Patent No.: US 8,769,552 B2
(45) Date of Patent: Jul. 1, 2014

(54) EVENT HANDLING SYSTEM

(71) Applicant: AT&T Mobility II LLC, Atlanta, GA (US)

(72) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/937,514

(22) Filed: Jul. 9, 2013

(65) Prior Publication Data

US 2014/0019996 A1 Jan. 16, 2014

Related U.S. Application Data

(63) Continuation of application No. 11/763,971, filed on Jun. 15, 2007, now Pat. No. 8,522,258.

(51) Int. Cl.
*G06F 13/00* (2006.01)

(52) U.S. Cl.
USPC .......................................................... 719/318

(58) Field of Classification Search
CPC ...................................................... G06F 9/542
See application file for complete search history.

(56) References Cited

U.S. PATENT DOCUMENTS

| | | | |
|---|---|---|---|
| 4,937,743 A | 6/1990 | Rassman et al. | |
| 5,623,404 A | 4/1997 | Collins et al. | |
| 5,983,198 A | 11/1999 | Mowery et al. | |
| 6,282,486 B1 | 8/2001 | Bates et al. | |
| 6,370,231 B1 | 4/2002 | Hice | |
| 6,411,815 B1 | 6/2002 | Balasuriya | |
| 6,446,004 B1 * | 9/2002 | Cao et al. | 701/482 |
| 6,678,613 B2 | 1/2004 | Andrews et al. | |
| 6,879,836 B2 | 4/2005 | Nakamoto et al. | |
| 6,898,569 B1 | 5/2005 | Bansal et al. | |
| 7,359,864 B2 | 4/2008 | Carlson et al. | |
| 7,499,715 B2 | 3/2009 | Carro et al. | |
| 7,565,157 B1 | 7/2009 | Ortega et al. | |
| 7,693,735 B2 | 4/2010 | Carmi et al. | |
| 2001/0014911 A1 | 8/2001 | Doi et al. | |
| 2002/0016645 A1 | 2/2002 | Jacobs et al. | |
| 2002/0035493 A1 | 3/2002 | Mozayeny et al. | |
| 2003/0060979 A1 | 3/2003 | Andrews et al. | |
| 2004/0085909 A1 | 5/2004 | Soliman | |
| 2005/0033593 A1 | 2/2005 | Abrams | |
| 2005/0288035 A1 | 12/2005 | Wang | |
| 2006/0293065 A1 | 12/2006 | Chew et al. | |
| 2007/0060129 A1 | 3/2007 | Ramer et al. | |
| 2007/0061245 A1 | 3/2007 | Ramer et al. | |
| 2007/0061300 A1 | 3/2007 | Ramer et al. | |
| 2007/0061301 A1 | 3/2007 | Ramer et al. | |
| 2007/0061302 A1 | 3/2007 | Ramer et al. | |
| 2007/0073717 A1 | 3/2007 | Ramer et al. | |
| 2007/0073722 A1 | 3/2007 | Ramer et al. | |

(Continued)

*Primary Examiner* — Andy Ho
(74) *Attorney, Agent, or Firm* — Baker & Hostetler LLP (57) ABSTRACT

A service that determines what event has occurred and provide a list of actions that the service can be performed in order to help the user through a hectic time period is disclosed. In one example, one or more modules can identify one or more events and transmitting an indication of the at least one event to a mobile device. Then, one or more modules can receive an indication that a mobile device has selected at least one of the at least one event, and determine at least one action to perform, wherein the at least one action can be associated with the at least one selected event.

20 Claims, 6 Drawing Sheets

(56) References Cited

U.S. PATENT DOCUMENTS

| | | |
|---|---|---|
| 2007/0287473 A1 | 12/2007 | Dupray |
| 2008/0200161 A1 | 8/2008 | Morse et al. |
| 2008/0263151 A1 | 10/2008 | Doi et al. |
| 2009/0012806 A1 | 1/2009 | Ricordi et al. |
| 2009/0029681 A1 * | 1/2009 | Clemow et al. ............ 455/412.2 |

* cited by examiner

EVENT HANDLING SYSTEM

CROSS REFERENCE TO RELATED APPLICATIONS

The instant application is a continuation application of, and claims priority to, U.S. patent application Ser. No. 11/763,971, filed Jun. 15, 2007. U.S. patent application Ser. No. 11/763,971 is incorporated herein by reference in its entirety.

BACKGROUND

A large number of people today own mobile devices, and some of these people have come to regard their mobile device as a necessity. It is common for people to carry their device everywhere they go and leave their devices on 24 hours a day, and this offers service providers a unique opportunity to sell services and products to individuals that will always be connected to the system. This is evident in the fact that as technology advances, so has the number of products and services that have been incorporated into mobile devices and offered to customers for a price. An interesting trend is to utilize technology that pinpoints the location of mobile devices within the network and use that information to provide consumers with services that take the location of the person into account. U.S. patent application Ser. No. 11/337,234 filed on Jan. 19, 2006 herein incorporated by reference is one such patent application that describes multiple ways of utilizing a consumer's location to provide targeted services. Generally speaking, the Application describes techniques that rank search results by analyzing a user profile, and the location of the mobile device when the search request was submitted. The ranking mechanism then generates search result that are tailored to the individual by filtering out search results that are irrelevant based on the user's profile and location. Targeted search results give any service provider who offers them a leg up when marketing their product to consumers, because in today's market, the provider that offers the most dynamic services at the lowest price will probably generate the largest profits.

Currently, the technological advances in this area have been directed towards targeted advertising and targeted search results. While these services are important, these are just a few of the services that utilize data such as a customer's profile and their location and these services fail to help users handle stressful situations for example other than by passively responding to search requests with pages of results. If a user is in a stressful situation, for example, if their vehicle breaks down on the side of the road and they are late for a meeting, being able to search for towing companies, or taxi cabs, will help the user, but it fails to handle the problems that the user currently has. What is needed is a service that determines what event has occurred and provide a list of actions that the service can be performed in order to help the user through a hectic time period.

SUMMARY

An embodiment includes a method. In one example, the method includes but is not limited to one or more modules that identify one or more events and transmits the one or more events to a mobile device; and then receives an indication from the mobile device that at least one event was selected and determines one or more actions to perform, that are related to the at least one event that was selected.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other aspects are described in the claims, drawings, and text forming a part of the present application.

An embodiment includes a method. In one example, the method includes but is not limited to one or more modules that can identify one or more actions related to one or more events, and then identify one or more remote users 101-N associated with the identified one or more actions, access the schedules of the one or more remote users 101-N associated with the identified actions, determine whether the one or more actions will affect the schedules of the one or more remote users, and modify the one or more actions based on the schedules of the one or more remote users.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other aspects are described in the claims, drawings, and text forming a part of the present application.

An embodiment includes a method. In one example, the method includes but is not limited to at least one module that can detect a location of a mobile device, access a schedule of a user, and access and a user profile of the user and then determine that at least one event has occurred, wherein the determination utilizes information that includes the location of the mobile device, the schedule of the user associated with the mobile device, and the user profile of the user, select at least one action that can be performed in response to the occurrence of the event, wherein the selected action is based on the determined event, the location of the user, the schedule of the user, and the profile of the user, and perform the at least one action.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Figure 1:
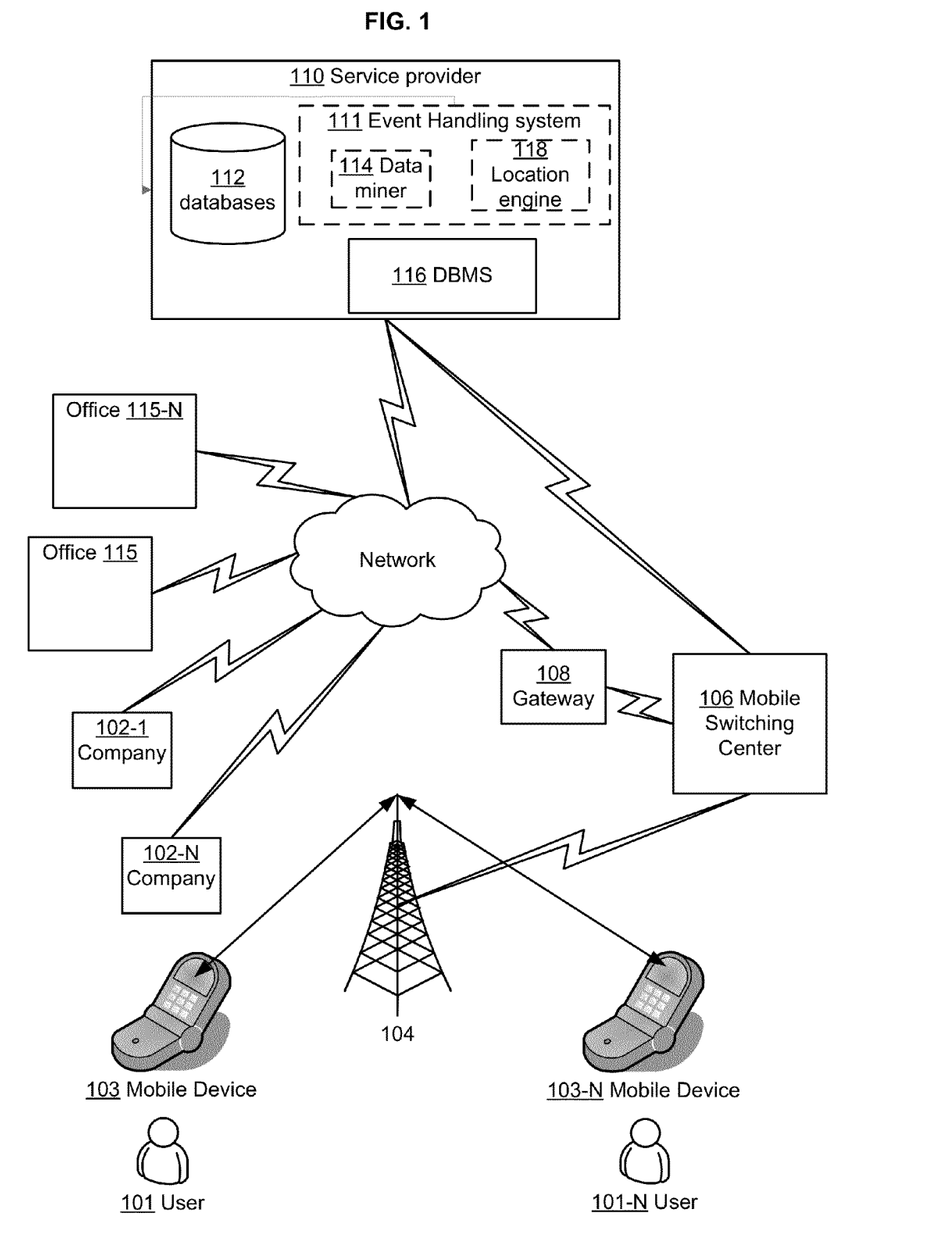
FIG. 1 depicts an example operating environment wherein operational procedures of the present disclosure may be practices.

The example system of FIG. 1 is described in more detail below with respect to how the elements depicted interrelate with the operational procedures described herein. One skilled in the art will note that the example elements depicted in FIG. 1 are provided to show an operational context to practice aspects of the present disclosure. Thus, the example operational context is to be treated as illustrative only and in no way limit the scope of the claims.

FIG. 1 depicts an example operating environment wherein operational procedures of the present disclosure may be practices. FIG. 1 depicts a service provider 110 that may own, or utilize electronic equipment to provide services that include, but are not limited to, wireless telephone services, SMS messaging services, targeted advertisements, and services such as those illustrated in the present disclosure. FIG. 1 depicts a plurality of users 101 through 101-N (where N is an integer greater than 1). Each user 101 through 101-N may own, or have access to, a device 103 through 103-N. One skilled in the art will recognize that a device may include, but is not limited to, a cellular phone, a pocket pc, a personal digital assistant, or any device that communicates via a mobile communications protocol, such as the advanced mobile phone system, code division multiple access, time division multiple access, global system for mobile communications, etc. The device 103 through 103-N may be in wireless communication with a base station 104. Generally speaking, the base station 104 includes any equipment necessary for transmitting and receiving radio signals from devices 103 through 103-N, and the base station 104 may be operably coupled to a base station controller (not shown) that controls the base station 104.

The exemplarily system depicted in FIG. 1 also includes a mobile switching center 106 that can be operably coupled to a base station controller (not shown). The mobile switching center 106 provides services, such as voice, data, fax, and short message services to the mobile devices within the area that it serves. The mobile switching center 106 may be coupled to a gateway 108 that acts as an interface between the mobile network and a packet based network, such as the internet.

As stated above, the gateway 108 can be connected to a network such as the internet that connects the mobile devices 103-103-N to other users who can be located at a companies 102 through 102-N that provides services or sell products. In some example embodiments, the companies 102-102-N may sign up for services with the service provider 110 that enables them to participate in the event handling system of the present disclosure along with users 101-101-N. In one example embodiment of the present disclosure, the company 102 may be an auto repair shop, supply store, restaurant, or any other type of company. In addition to companies 102, and users 101-101-N, FIG. 1 includes offices 115-115-N that can sign up to participate in the event handling system of the present disclosure. These offices 115-115-N may be the office or place that user 101 works at for example. In some embodiments of the present disclosure, the user 101 may have a work PC (not shown) located at their office 115 and work with multiple other employees (not shown).

In addition to being connected to a gateway 108, the mobile switching center 106 can be connected to a service provider 110. As depicted in FIG. 1, a service provider 110 may include a combination of hardware and/or software that may facilitate aspects of the present disclosure that includes, but is not limited to, a database management system 116, the event handling system 111 of the present disclosure, a location engine 118, and/or a data mining program 114. Generally speaking, and described more fully below, the event handling system 111 of the present disclosure 111 may include, but is not limited to, one or more modules, that can be any combination of hardware, software, and/or firmware configured to identify the occurrence of an event and identify one or more actions that may be performed, or suggested, to the user 101 in order to quickly and efficiently handle the event.

As referred to in the preceding paragraph, the database management program 116 may include one or more software programs designed to manage one or more databases of information 112 and the databases of information 112 may include user 101 accounts associated with the users 101-101-N, users associated with office 115 through 115-N, and companies 102 through 102-N. Within one, or more of the databases 112 a user profile for each user 101 through 101-N, and profiles for companies such as 102 through 102-N can be stored. In some embodiments, the databases 112 may comprise a relational database, an object oriented database, or a database that incorporates features of either type. Regardless of the type of database utilized, each entry (event or action taken) in the database may be associated with other entries (other events, or other actions taken).

The information stored in the user's profile may include, but is not limited to information explicitly given by a user, i.e., account information like a social security number, a drivers license number, a home address, a job description, group membership information, i.e., whether they are members of a family group, a work group, and/or members of a group based on their traits, i.e., single, mid-20s, car owner, home owner, etc. Companies 102 through 102-N may provide information for their profile such as services offered, hours opened, current inventory, current availability, etc., and may themselves belong to one or more groups such as AAA certified group, towing company group, restaurant group, etc. In some embodiments of the present disclosure, in addition to information provided by the user, the user profile may contain information such as what events the user 101 has experienced and requested the system to handle in the past. In addition to the events the user 101 experienced, the profile may include information about how the user 101 has handled the situation. For example, the user 101 may have utilized the system of the present disclosure to handle an event such as a stolen car. As described more fully below, the system can process the occurrence of the event and output a list of actions related to handling the event such that the user 101 can select one or more of the actions and the system can perform the requested actions. As described below, in some embodiments, the system can record the action taken in response to the event and store that in the user's profile. As one skilled in the art will appreciate, the more times a user 101 utilizes the event handling system 111 the more likely it will be able to predict the occurrence of an event, and the more likely it will be able to predict what action the user 101 would like to take in response to the occurrence of the event. Thus, one skilled in the art can envision that in some instances all the user 101 may have to do is to activate their event handling feature on their phone and the system will predict what event has occurred and automatically perform one or more actions that it has identified as the most likely.

What type of events occur to a user 101, and how the user 101 handles them, can be stored in the user profile and a data miner 114 can extrapolate information from the user profile and compare the information obtained from the user 101, to information of all the users 101-N in the system in order to identify groups, subgroups, and the trends (what type of events happen to certain people, and how they handle the event) of the users and groups of users 101 through 101-N. The event handling system 111 of the present disclosure can then make predictions for users based on their group status which allows the system to predict events in batches in order to allow the system to scale.

The data miner 114 that can be configured to process information extracted from the events can include a number of data mining engines or algorithms configured to identify trends and store these trends as, for example, associations between data (events, and actions taken) stored in the databases 112. For example, in one embodiment the data miner 114 can be configured to discover rules and patterns related to how a user 101 reacts by monitoring the user's response to events, i.e., what actions are taken. For example, each action take can be thought of as a transaction and the data miner may associate actions taken with events and store those patterns in one or more databases 112. A specific example of this may include, a user 101 indicating to the system that they are hungry by selecting an event related to hunger and the action they take could, for example, be "contact pizzeria." The data miner 114 could then associate the action taken (call pizzeria) with the event, "hungry user". The miner 114 may utilize information such as the profile of the user, the location of the user, and the schedule of the user 101 when the user 101 accessed the system to create, and store metadata indicating that this association is valid for people that are similar to the user. Thus, if the user, or a user 101 with a similar profile, under similar circumstances activates an event handling program on their mobile device, the system may identify an event related to the user's hunger and display the "call pizzeria" action, or in another specific example the system may determine that the user 101 is probably hungry and the pizzeria is probably the place the user 101 will contact, and the system may automatically send, for example, an email to the pizzeria that orders a pizza for the user. In one or more example embodiments, the system may transmit relevant information about the transaction to the company 102 that is related to the action (in this example the fact that the user 101 likes cheese pizza may be identified by the system and the email may include a request for a cheese pizza).

In addition to processing information obtained from use of the system, the data miner 114 could mine information about the user 101 based on their web surfing habits for example. Users may surf the web via their mobile device's browser and purchase products and services online. A copy of the web pages viewed by the user, or the url of the web pages may be recorded by, for example, the mobile device 103, and/or a mobile switching center. This information can be transmitted to the service provider 110 and associated with an account of the user 101 stored in a databases 112. The database miner 114 may access the information relating to the websites visited by the user 101, and mine the pages using a data mining technique to determine what types of web pages a particular user 101 enjoys, or what kind of content the user 101 is interested in.

In another example embodiment, the service provider 110 may affiliate with other companies 102 through 102-N that sell products and services via the internet. The companies 102-102-N may provide information about items, or services purchased by the users 101-101-N to the service provider 110. The data miner 114 may utilize this information to further refine what content a user 101 is interested in.

Additionally, or alternatively in another example embodiment the service provider 110 may affiliate with, or offer, a information requesting service. For example, a mobile device user 101 may call information and speak with a representative. The representative can provide information to the user 101 and give recommendations to the user. The representative may identify the user 101 by, for example, capturing the phone number of the user 101 via a caller ID subsystem. The representative may enter into a computer system information about the substance of the call and whether the user 101 indicated that any recommendations were acceptable. The data miner 114 may then process this information and store this information in a user profile stored in a databases 112.

In another example, the service provider 110 may send advertisements to the user 101 through 101-N and monitor the user's response to the advertisements. This provides another layer of information the data miner 114 may utilize when generating a user profile related to a user 101.

In addition to mining data obtained explicitly or implicitly from the user, the data miner 114 can access and utilize information in the personal information manager of the user. For example, the data miner 114 may capture information such as calendar events "pushed" or "pulled" from the mobile device of the user 103, mine them, and store any relationships, or user profile information in the databases 112. One skilled in the art will appreciate that the preceding information that may be utilized by a data miner 114 is exemplary only and that a data mining process or algorithm may utilize any number of explicit or implicit input to formulate a user profile, and there are many data mining algorithms or techniques in the art and the invention is not limited to any particular technique.

As mentioned above with respect to the data miner 114, and depicted in the exemplarily system of FIG. 1, the service provider 110 may optionally include a location engine 118 that is configured to locate a mobile device 103 selected from a group of mobile devices 103-N. The location engine 118 may locate a mobile device within its network by utilizing various techniques. For example, in one embodiment the location can be determined by comparing data from multiple base stations. Mobile devices that are connected to the mobile network transmit and receive data at predetermined intervals allowing the mobile switching center to find a particular device if a telephone call needs to be sent to the device. The service provider can accomplish by analyzing data such as the signal strength of the return message sent by the mobile device, the time deference between when a signal was sent from the tower and when the tower receives a response from the device, or the a triangulated position determined by the intersection of signals sent by a mobile device and received by multiple towers. In another example embodiment, the device may include a GPS or an A-GPS subsystem. In embodiments that include GPS, or A-GPS, a network of satellites may capture position data of the mobile device and pinpoint a user's location.

Figure 2:
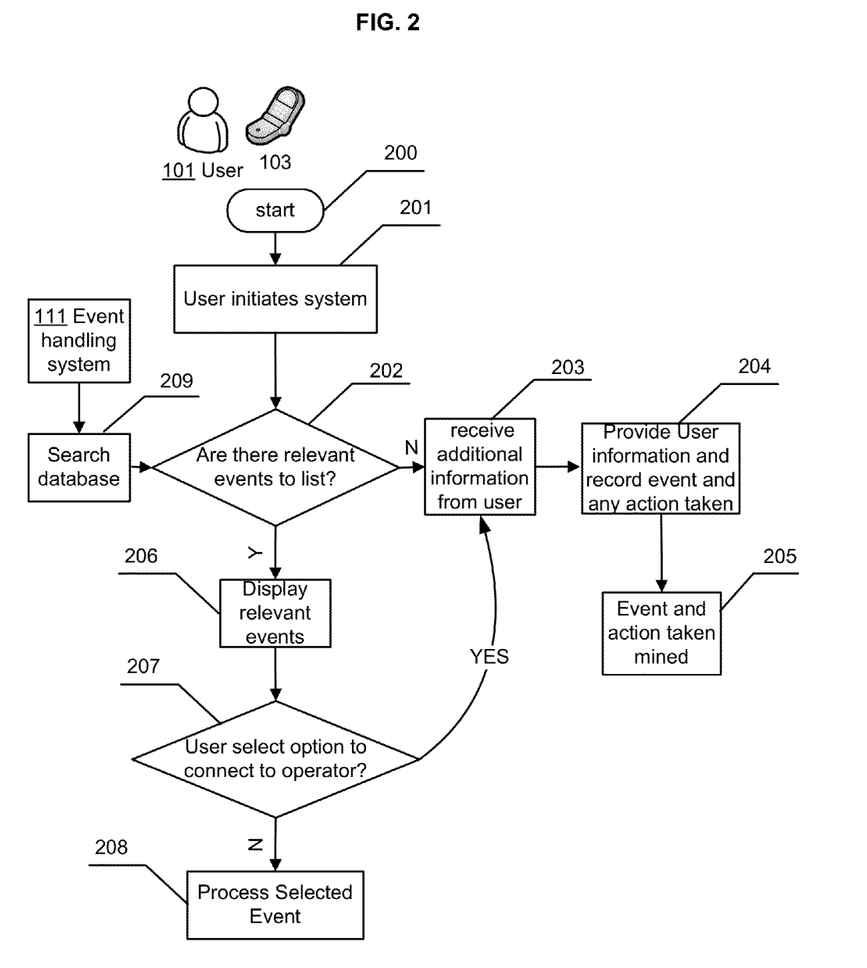
FIG. 2 illustrates an exemplarily operational flow chart depicting aspects of generating a list of events.

As describe above, the data miner 114 can be configured to process and identify associations between events and actions that can be performed, and in some example situations the events and actions may be recorded by an operator affiliated with a service provider who helps a user 101 with a problem and adds the problem, the advice suggested to the user 101, and the action taken by the user, to the user profile stored in the databases 112. An example high level flow chart depicted in FIG. 2 illustrates an exemplarily operational flow chart related to techniques for generating a list of events. In this exemplarily flow chart, the event handling system 111 can generate one or more lists of relevant events by analyzing input provided by an operator that can interact with the user 101, or analyze the databases 112 for events that the user 101 could be experiencing when they activate the event handling system 111. As shown in FIG. 2, the operational process begins at 201 when the user 101 initiates the system by, for example, starting the event handling program client on their mobile device. For example, a user 101 may experience an event such as a flat tire while they are driving to work. In this example, the user 101 may open their mobile device and activate their event handling program. When the user 101 initiates the program on their device, the mobile device can then access a locally stored database of events, or in other embodiments, access a remote database stored at the service provider and request a list of possible events that may have occurred. More specifically, in some embodiments of the present disclosure, events can be transmitted to the user 101 and stored in the database of the mobile device. A list of events may be generated and transmitted to the user 101 every couple minutes for example, or when the system detects that the user 101 has changed location, or an event in their schedule. In other embodiments, the list may not be generated until the user 101 accesses the system via, for example, a browser like program on their mobile device 103.

As illustrated at 202, the event handling system 111 can perform a query to determine whether there are any events that could of occurred, and in the situation where the user 101 has not selected an event under similar circumstances, and/or there is not enough information in the system (i.e., the user's profile may be incomplete, or the data miner 114 has not yet identified a trend in the user's activities) that associates an event with the user 101, the event handling system 111 may only display an option to contact an operator, or perform a search. As depicted by 203, when the system can not predict an event reliably, the system may connect the user 101 to an operator that the user 101 can, for example, describe their situation to, and the operator can provide help or information to the user 101 about how they can help the user 101 handle the event as shown at operation 204. In another example, operation 203, and operation 204, may include the situation where the user 101 inputs a search criteria such as "flat tire" into a search engine and a list of search results can be transmitted to the user, the user 101 may access the websites of the companies 102-102-N indicated in the search and call their phone number for example. The event handling program operating on the client, for example, can then capture the fact that the user 101 called a particular company after entering a certain search string and associate the search with contacting the specific company.

In the example where the user 101 contacts an operator, the operator may provide the user 101 with a list of towing companies or taxi companies within the general location of the user 101 and offer to connect the user 101 to any company the user 101 wishes, or in another example, if the operator has access to the user's schedule, the operator may ask the user 101 if they want to reschedule their 3:00 meeting and offer to contact the invitees at operation 204. Any action taken, or rejected by the user 101 may be recorded by the operator and entered in the user's profile to be processed by the data miner 114 at 205. The miner 114 may associate the event, and any action taken or rejected by the user 101 with, for example, the schedule and location of the user 101, and the location and schedules of other users 101 that have similar attributes as the user 101, such that if the user 101 activates the event handling system 111 in the future under similar circumstances the event "flat tire" can appear on the list of events that the event system of the present disclosure may handle for the user 101.

Continuing with the example operational flow example depicted on FIG. 2, in at least one embodiment of the present disclosure, the event handling system 111 may predict one or more events to display to the user 101 at 202. As depicted by 202 and 209 in FIG. 2, in one example, a request can be sent to a prediction engine, i.e., one or more modules that may be included within, or coupled to, the event handling system 111 to search one or more databases 112 for events that could be relevant to the user 101 based on, for example, the location of the user 101. Generally speaking, the location of a mobile device may be obtained every couple minutes via a triangulation technique or GPS. Thus, the location of the user's mobile device can be recorded for a period of time and the prediction engine may use the calculated position of the user 101 over a time interval to determine what events to display to the user.

In another example, of operations 202 and 209 of FIG. 2, the prediction engine of the event handling system 111 may generate a search result that includes an entry that is based at least in part on the user profile associated with the user 101 of the mobile device 103 sending the request, and/or the user profile of other users that have accessed the system under similar circumstances, e.g., the other users 101-N may have selected the same, or a similar event, the users 101-N may have selected the same or the similar event when in a location near that of the user 101, and/or the users may have a similar user profile. This information could be obtained by analyzing information about what actions the user 101 takes during a certain time of day, i.e., the prediction engine of the event handling system 111 may have determined that the user 101 eats around this time of day by associating the events selected and the time stamp of when the user 101 accessed the system for example. In another example, an event could be associated with a time by analyzing how the user 101 uses their mobile device, i.e., the user 101 may have utilized the web browser of their mobile device to search for pizza restaurants, or may have dialed the number of a Chinese restaurant a couple of times in similar circumstances, i.e., similar location, similar time, similar schedule. The prediction engine may utilize this information in conjunction with the restaurants the user 101 has indicated as places they like to eat (i.e., the user 101 may have given it 4 stars on a reviewing website affiliated with service provider), and/or the restaurant is located near the user 101 to create associations between the time of day a user 101 accesses the system, events, and actions the user 101 generally takes.

Alternatively, or additionally, 202 and 209 of FIG. 2 may include a prediction engine coupled to the event handler system 111 that generates a search result that includes an entry that is based at least in part on the schedule of the user 101 stored in a personal information management program as a variable in its query to the databases 112 of information related to the event. In this example, the event handling system 111 may analyze, or may have previously analyzed, any calendar entries and determine that an event may have occurred that is related to a scheduled event, for example, a meeting that covers a certain block of time (the miner may determine that the event is a meeting utilizing one or more algorithms that, for example, scans any text associated with the entry for certain words indicative of a meeting, or the event creator may have associated some meta-data with the event indicating to the scheduler that the event is a meeting and not some other type of event) and forward that information to the prediction engine along with other events that are coming up on the user's calendar.

In the instances described in the preceding paragraphs, at operation 206 the system can predict one or more events that may have occurred to the user 101 and display the relevant events to the user 101. For example, if the user 101 has previously had a flat tire and utilized the system for assistance, the next time the user 101 is, for example, on the same road where they had the flat, or any other road, and they activate the system the list of events may include an entry such as "car problems?", and an option to contact a operator to help if the user 101 is not experiencing any car problems at 207. The user 101 may then select the car problems event, or any other event, and the mobile device may transmit a signal to the service provider that includes information indicating that the user 101 selected an event at 208. As one skilled in the art will appreciate, the disclosed system includes, but is not limited to, an iterative process such as the process described in FIG. 2, wherein the more times a user 101, or users 101-N with similar profiles (similar groups, similar circumstances) use the event handling system 111 the more inferences the system can make about what events a user 101 is experiencing when they activate the event handling system 111, thus the more the system is used by the user, and by other subscribers the less a user 101 will have to contact the operator. Furthermore, while one type of iterative process is described, the invention is not limited to any type of process utilized to generate a list of events and the example operational flow of FIG. 2 is exemplarily only.

Figure 3:
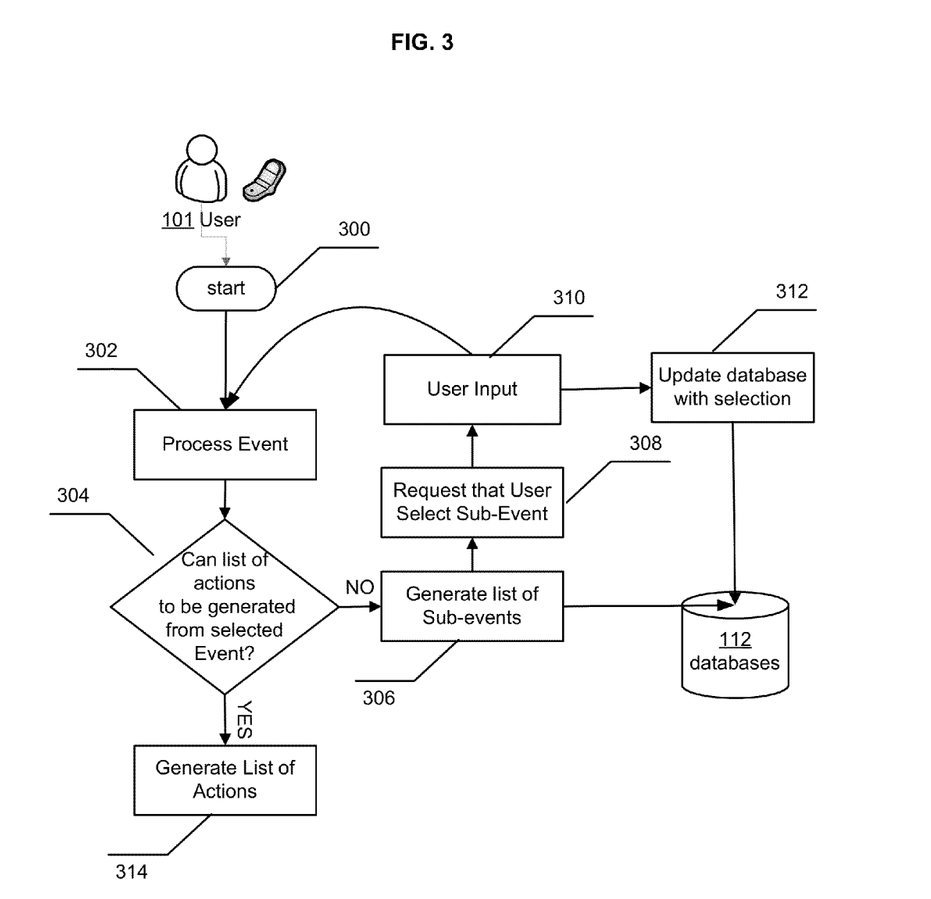
FIG. 3 illustrates an exemplarily operational flow chart depicting aspects of generating a list of actions.

As depicted in FIG. 3, in some embodiments of the present disclosure the event handling system 111 may not include enough information to make an accurate prediction for the user 101 based on the user's selection of an event, but include enough information to display one or more high level events. In this exemplary operational flow, the user 101 may select the an event such as "car trouble" and the operational flow begins at 300. As illustrated by operation 302, the occurrence of the event can be processed utilizing input such as the high level event selected, the location of the user 101, the schedule of the user, and the user's profile. For example, a high level event may include, but is not limited to, an abstracted event, i.e., car problems could be a high-level event that includes events like flat tire, transmission problems, out of gas, etc.

The event handling system 111 may begin by providing the user 101 with a list of high level events and the event handling system 111 can access one or more method or procedures to predict one or more actions to recommend to the user 101 to handle the event as illustrated at 304. In this example operational flow, the event may be too abstract in order to accurately predict a list of actions, i.e., the list of generated actions for an event such as car trouble may include thousands of actions that could be recommended, and the system could be overwhelmed if it was required to process a volume of requests for such high level events. Thus, as illustrated by operation 306, the system may select one or more events from the one or more databases 112 that are narrower in scope then the original event. In this case, at 306 the event handling system 111 may select the most likely sub-events that fall within the scope of the selected event based on, for example, the schedule of the user 101, the location of the user 101, and/or the user's profile, and transmit a list of them to the user 101 with a request to select one of these sub-events at 308. The input by the user 101 can be captured at 310, stored in the databases 112 at 312, and utilized to refine the any search event processing that occurs in the future. Once the sub-event is selected the sub-event may be processed and the system can attempt to generate a list of actions at 302 that the user 101 may want to take and if the system can make an accurate prediction of the actions a user 101 would want to take then the list can be generated at 314.

In some embodiments of the present disclosure, after a list of events is generated by the prediction engine, of the event handling system 111 it may be transmitted to the user 101 in order to obtain explicit input indicative of what event the user 101 is interested in. This information can be stored in the databases 112 and utilized to further refine future searches by the user 101, or any other user 101-N with a similar profile. For example, once the user 101 selects one of the high level events displayed in their list of events, e.g., the user 101 selects the event "car related problems", the prediction engine processes this input to refine the list of events transmitted to the user. In this example embodiment, the prediction engine can rely on implicit user 101 input, i.e., input captured by the scheduler, the user profile, and the location of the user, and explicit user input, i.e., the selections the user makes, to generate a list of events that can be refined and narrowed each time the user 101 selects one. One skilled in the art will note that the prediction engine in some example situations can obtain enough information from implicit user input to generate a high level list of events and sub-events without requiring any input from the user.

For example, in some embodiments of the present disclosure a list of events and sub-events can be created by analyzing the selections made by a user 101 and pre-caching the results of the selections on the user device 103 if the user 101 has selected this path in a similar situation, i.e., similar location, similar time of day, and/or similar schedule, and thus, this information can be captured and stored in the user profile. This allows the service provider to send a list of events and sub-events to the user 101 when they first activate their event handling feature on their mobile device. In some situations, the user's experience with the system may be improved by sending the entire list to the user 101, this allows the user 101 to quickly through the list without experiencing loading times. Similar to that described above, each sub-event can be selected by the event handling system 111 based on any combination of the location of the user, the profile of the user, and/or the schedule of the user. For example, the scheduler may organize a list that includes this sub-event list by, for example, receiving information from the user 101 indicating that they have car trouble and utilizing this event in addition to utilizing one or more of the events in the schedule of the user, the location of the user, and the profile of the user. The prediction engine may utilize a combination of the preceding factors to generate a list of, for example, the top 3 sub-events that have a highest probability rating.

One skilled in the art can appreciate that events (events and sub-events) may be interrelated such that traversing one path, i.e., selecting one high level or meta-event, may led to the generation of a new event, that in turn will include its own hierarchy of sub-events. For example, in one embodiment of the present disclosure, a user 101 may select one or more paths and reach a sub-event. In some situations, if the user 101 selects this sub-event other events in the calendar of the user 101 may be affected by the user's decision. The selection of an event that affects another event may lead the system 111 to process a new list of events. More specifically, if the user 101, for example, selects an event such as "reschedule meeting" and the user 101 is scheduled to fly home at 6 pm, the event handling system 111 may note that a conflict exists and attempt to determine the distance from the location of the meeting to the airport. In the event that the distance is too great, i.e., utilizing the speed limits of the roads to estimate how long it will take to get from the meeting to the airport, the event handling system 111 may create a new list of events based on one or more factors such as the future location of the user, the future schedule, and profile of the user.

Figure 4:
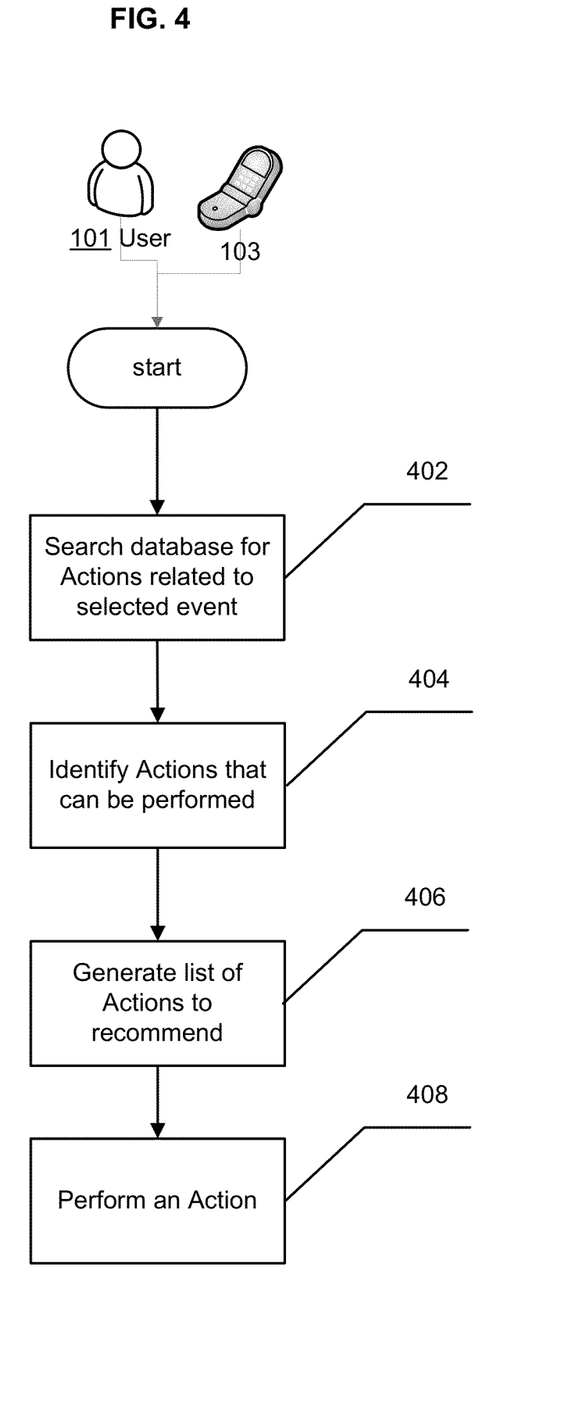
FIG. 4 illustrates an exemplarily operational flow chart that illustrates example operational procedures related to recommending actions to a user 101.

FIG. 4 illustrates an exemplarily operational flow chart that illustrates example operational procedures related to recommending actions to a user 101. In at least one example embodiment, once the event has been selected a search for appropriate actions to recommend to the user 101 may be performed. A search of the databases 112 can be conducted at operation 402 that utilizes information such as the user profile, location of the user 101, and schedule of the user 101 in conjunction with the selected event, and the results of the search can be forwarded to a scheduling process or module that can be part of, or electronically coupled to, the event handling system 111. In at least one embodiment of the present disclosure, the scheduler may include, but is not limited to, one or more software modules that can retrieve information related to the schedule of a user 101 and any remote users 101-N. The scheduler can access data stored in, for example, an electronic calendar that may be accessed via the mobile device 103 and integrated with a personal information management software program installed on a user's 101 computer (not shown). In an integrated personal information system, any entries made by a user 101 on their personal computer may be transmitted to their mobile device 103. The scheduler may either facilitate the transfer of contacts, appointments, email, etc., or for example, the scheduler may capture that information as it passes through the mobile network, i.e., as PIM items are pushed or pulled to or by the mobile device a copy can be intercepted at, for example, the mobile switching center. In addition to information about the user's schedule, the scheduler can have access to information about one or more companies that, for example, sign up to be part of this event handling service. The information the scheduler may obtain about companies may include, but is not limited to, information about when the company is open, inventory of the company, or any other type of information that may be relevant to a customer that can be stored in the companies 102-102-N profile.

The scheduler can then additionally process the search results obtained in operation 404 to eliminate, or prioritize, search results based on the schedule of the user, and the schedule of the entity identified in the search. The action may include, but is not limited to actions related to the event, such as, call tire company, call taxi company, and actions related to other scheduled events, such as, cancel 3:00 meeting, change flight plans, reschedule dinner with spouse, etc. For example, the scheduler can access one or more databases 112 of information that includes a list of events, and the actions that users, or the user, has taken in response to the occurrence of these events in the past. The prediction engine may be electronically coupled to, or include a scheduler algorithm or procedure that may generate a list of recommended actions to take based on the entries in the databases 112 and how the recommended actions impact current events in the user's schedule as illustrated at block 406.

In another example embodiment, an event such as "car problems" could have been selected by the user 101 and processed at 402. If the event is "flat tire", and a search of actions related to "flat tire" identifies an action such as call one of three tire companies of equal distance from the user 101, the scheduler may rank these companies based on whether the company is open, or whether the company has the right tires in stock, for example. In addition to eliminating or prioritizing search results based on the schedule of the user, and/or the schedule of an entity associated with the search result, the scheduler may nest the actions in a tree like structure based on various levels of abstraction. For example, a high level event that selected by the user 101 could have been "car related problems" and the prediction engine may have generated actions for multiple different types events that could be considered car related problems. In this example, the scheduler could categorize the actions based on the type of car trouble the user 101 could be experiencing such that, shops that primarily deal with flat tires may not be grouped with shops that primarily deal with transmission problems.

Once the scheduler has prioritized, organized, and/or eliminated actions related to the event selected by the user, as shown by example operation 408, the system can allow the user 101 to select one or more actions that they would like to have performed on their behalf, or in another embodiment the system can perform the action the user 101 will most likely take. In some example situations, the action to be performed can be a rescheduling of some entry in the user's calendar, however in some situations the action the user 101 would like to perform involves having a conversation with one or more remote users 101-N. In some embodiments of the present disclosure the event handling system 111 may allow the user 101 to set up a conversation with remote users 101-N who are related to the event selected by the user. In the situation where the user 101 selects an action, for example, "contact tire shop", the service provider can facilitate a dialog between the user 101 and the remote users 101-N affiliated with the tire shop selected. In some embodiments of the present disclosure, the service provider can send a message to remote users 101-N who are related to the selected event based on, for example, the groups each remote user 101-N belongs too, the profile of the remote user, the location of the remote user, and the schedule of the remote user. For example, each user 101 of the system of the present disclosure may belong to one or more groups of users who share some common characteristic to either the user 101 or the action requested by the user 101. In one specific embodiment, a user 101 may belong to a family group that includes only family members, and a work group that includes members of a project team. In addition to these static groups, the user 101 may belong to groups based on an event, for example, a meeting group may comprise members of different project teams or even members of different organizations. The user 101 may also belong to groups based on their profile, or location.

One skilled in the art will appreciate that the more times a user 101 selects an action in response to the occurrence of a certain event, the more inferences the event handling system 111 of the present disclosure can make and record in the user's profile, such that after a while of using the system, the system can automatically predict what event the user 101 is experiencing, and what events the user 101 will want to perform in response to the event. Thus, in some example embodiments the system may generate a list of actions for the user 101 without receiving any explicit input at all, or in other embodiments, if the system has determined that the probability of an event is extremely high, and the probability that the action the user 101 is likely to perform is also high the system may perform the action without receiving an explicit request from the user.

Figure 5:
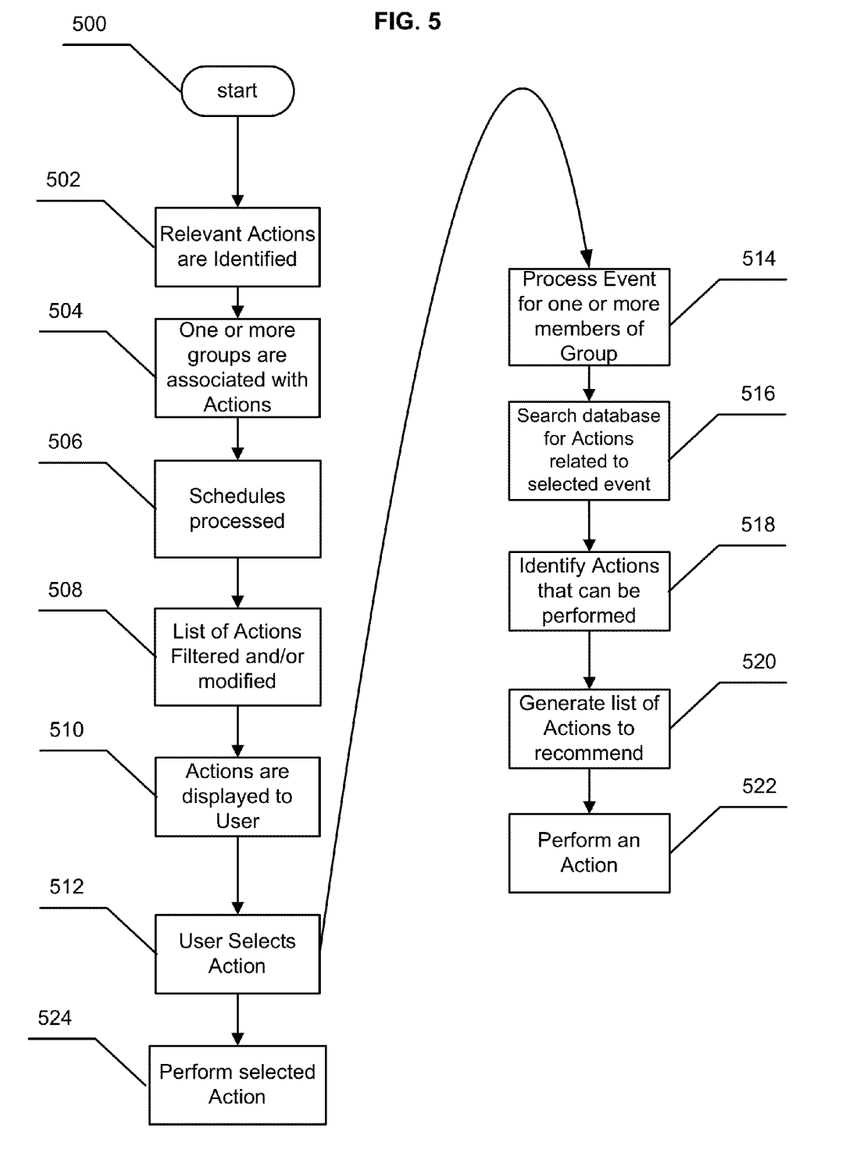
FIG. 5 depicts an example operational flow chart that one or more embodiments of the present disclosure may employ to handle events that affect remote users.

FIG. 5 depicts an example operational flow chart that one or more embodiments of the present disclosure may employ to handle events that affect remote users 101-N. In some instances, if a user 101 utilizes the event handling system 111 and communicates with one or more members of a group that are associated with one or more actions, the event handling system 111 can be triggered for each member of the group, because, the selection of an action by the user 101 is the occurrence of an event for the members of the group. In an exemplary operational flow, the occurrence of an event has been identified and a search has been conducted by the event handling system 111 by operation 500 and at operation 502 the relevant actions to handle the event have been identified. As stated above, the actions could be entries in one or more databases 112 that have been identified as actions that users perform in response to certain events. The probability that a user 101 will take a certain action in response to a certain event can be calculated by one or more algorithms configured to determine what are the most likely actions that a specific user 101 will take in response to a specific condition utilizing information such as the user profile, the location of the user, and the schedule of the user. A specific example of 502 may include, but is not limited to identifying actions that could be taken in response to a flat tire event, such as, "modify 3:00 meeting", "call tow truck company", "call babysitter", "reschedule 5:00 flight", etc. Once one or more actions have been identified by the system as valid actions to take in response to the occurrence of the event, the specific actions can be associated with one or remote users 101-N that can be involved in handling the event with the user 101 at 504. For example, and in addition to the previous example, the action "modify 3:00 meeting" could have information indicating who the meeting is with, for example, by accessing a list of invitees that is generally kept in a personal information managing system and established a relationship between the "modify 3:00 meeting" action and each remote user 101-N that is listed as attending the meeting.

As depicted by operation 506 in FIG. 5, once an association has been established between the action and one or more remote users 101-N associated with the action, the event handling system 111 of the present disclosure can search the schedules of the identified remote users 101-N in order to identify actions that could be taken that fit within the schedules of both the one or more remote users 101-N and the user 101. For example, and in addition to the previous example, once the group of invitees to the 3:00 meeting have been identified by the event handling system 111, the system may access the schedules of the invitees and determine the next time other than 3:00 all the invitees are available for a meeting. Once the scheduler determines a suitable time, the suggested action may indicate that this time can accommodate all the users depicted at 508. In another example, if the scheduler determines that there is no time to reschedule the 3:00 meeting within the next day, then a suggested action could be "cancel meeting", if in the situation where some, or all of the invitees are available at 5:00, a suggested action to take could be "reschedule meeting to 5:00". Once the actions are modified in response to the schedules of the users associated with the action, the suggested actions can be displayed as shown by operation 510. The user 101 may then select one or more of the suggested actions and the event handling system 111 can perform one or more operations to carry out the selected action at operation 524.

As depicted in FIG. 5, the exemplary operational flow includes additional operations 514, 516, 518, 520. In this exemplary operational flow, in addition to performing the selected action at operation 524, the event handling system 111 can process how the selected action affects the remote users 101-N by treating the selected action in 512 as an occurrence of an event for each remote user. For example, in the situation where a user 101 selects the action "reschedule meeting to 5:00", the change to the meeting time, while an action to the user 101, is an occurrence of an event to the remote users. In this situation, and similar to that described above with respect to FIG. 3, the event handling system 111 will begin to process how this event affects the remote user 101-N, i.e., if the meeting is rescheduled to 5:00, the system may conduct a search of the databases 112 for actions that the remote users 101-N may want to perform in response to the occurrence of the rescheduled meeting. As one skilled in the art will appreciate, each user 101 through 101-N that is affected by the performance of an action, may themselves want to take actions thus, the system can be configured in order to facilitate the event handling of any user 101 that is affected by the occurrence of an event.

Figure 6:
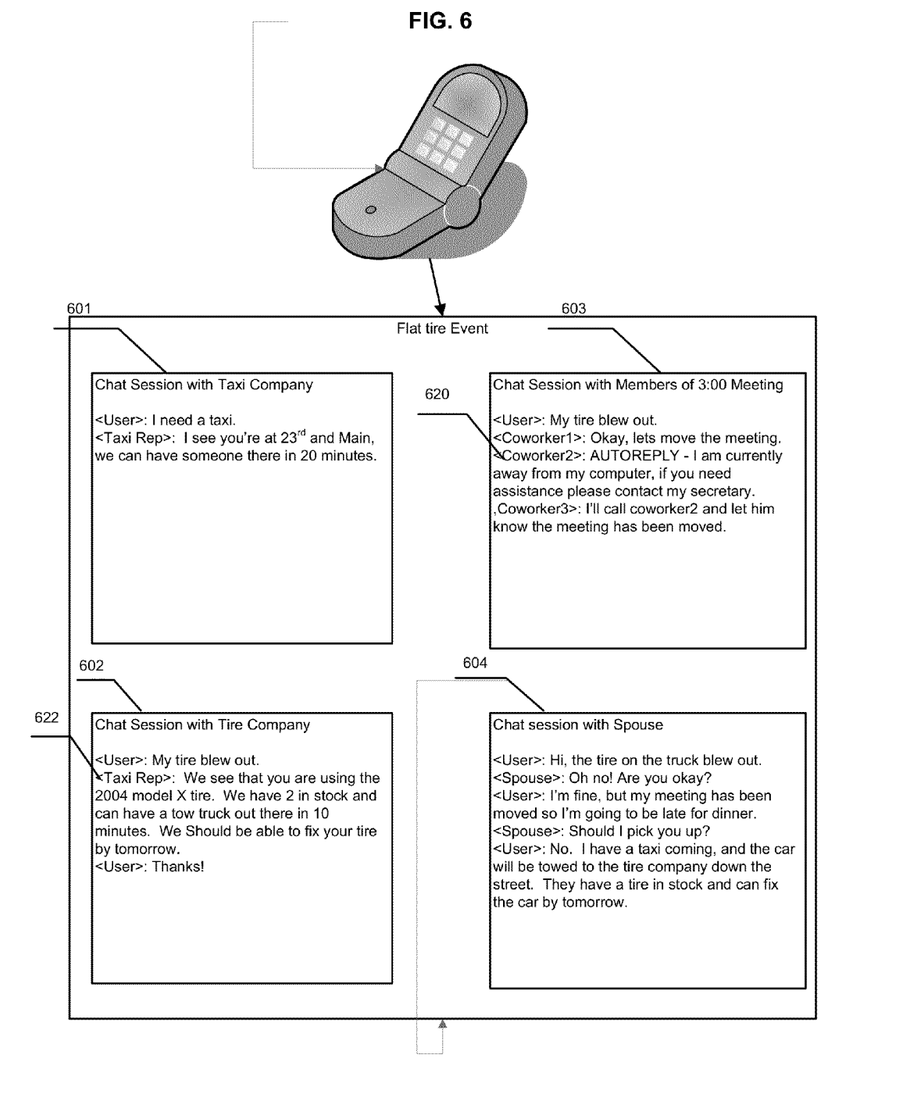
FIG. 6 generally illustrates an example action that can be performed in response to the occurrence of an event.

FIG. 6 generally illustrates an example action that can be performed in response to the occurrence of an event. In this example situation, the event that is depicted is a flat tire, and in response to the occurrence of the event the event handling system 111 of the present disclosure identified 4 actions to be taken. In this example, the suggested actions may have included, contact taxi company, contact tire company, contact members of 3:00 meeting, and contact spouse as illustrated by the boxes 601, 602, 603, and 604. In this exemplary situation, a user 101 can communicate with remote users 101-N that can be located at one or more companies 102-102-N or offices 115-115-N via multiple chat rooms that were opened between the user 101 and the remote users 101-N associated with the performed action, however one skilled in the art will appreciate that the means by which users 101 and remote users 101-N communicate is not limited to this embodiment and the type of communication mechanism utilized includes, but is not limited to, email, phone calls, text messages, and/or or a calendar entries/updates. Continuing with the example, four chat rooms may have been generated in the instance that the user 101 elected actions that require communication with members of 4 different groups of remote users 101-N. In this case, the system may have generated four chat rooms based on the fact that four distinct groups of remote users 101-N were associated with the selected action. More specifically, the taxi company in chat session 601 may have been sent a message because the event handling system 111 identified that this taxi company was closest to the user 101 and the taxi company belongs to a group that identifies it as a taxi company. The Tire company in session 602 may belong to a different group than the taxi company because they perform different services, and the event handling system 111 may have identified this company because the profile of the tire company indicated that it carries the type of tire on the user's car.

As depicted by 620 in FIG. 6, In some example embodiments of the present disclosure, the individual remote user 101-N may set auto-reply messages if they are sent a message from a user 101 of the system. The user 101 may be away from their desk, or the company may be closed for example.

Additionally, as depicted by 622 in FIG. 6, the system may send certain information in the message that is related to the group the remote user 101-N belongs too. For example, if an event occurs the user 101 may be under a lot of stress, i.e., they have a flat tire and they need to make a meeting, the last thing the user 101 will want to do is tell someone their situation while they are trying to multitask and communicate with multiple parties. Thus, the system in the present disclosure may retrieve information utilizing the user's profile, location, and schedule, and forward select information in them message if that information is relevant to the reason why the user 101 contacted them. For example, if the user 101 indicates that they have a flat tire by selecting a "flat tire" event or sub-event and the user profile contains information about what tires they have on their car the system may forward this information to the tire company so that the user 101 does not have to figure out what type of tire they have while they are in the middle of another conversation. Another example may include forwarding the location of the user 101 to the taxi company they sent a message too. In some instances the user 101 may not know where exactly they are and may take comfort in the fact that they will not have to figure that out while trying to reschedule a meeting.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. An apparatus comprising:
a processor; and
memory coupled to the processor, the memory comprising executable instructions that when executed by the processor cause the processor to effectuate operations comprising:
predicting an occurrence of an event in response to receiving an indication that a feature has been selected via a mobile device;
transmitting an indication of the event;
receiving an indication that the event has been selected via the mobile device;
determining a previous action that was selected to provide assistance with the event; and
determining a current action based on the previous action, wherein the current action differs from the previous action.

2. The apparatus of claim 1, the operations further comprising:
identifying at least one sub-event related to the event; and
transmitting the at least one sub-event to the mobile device.

3. The apparatus of claim 1, wherein the event is based on a location of the mobile device.

4. The apparatus of claim 1, wherein the current action is based on a location of the mobile device.

5. The apparatus of claim 1, wherein the event is based on the schedule of a user associated with the mobile device.

6. The apparatus of claim 1, the operations further comprising:
determining at least one entity associated with the current action; and
modifying the current action based on a schedule of the at least one entity.

7. The apparatus of claim 1, the operations further comprising:
receiving an indication that the current action was selected;
determining that the selection of the current action affects a future event; and
determining at least one future action to perform, wherein the at least one future action relates to the future event.

8. The apparatus of claim 1, the operations further comprising:
determining at least one entity that is related to the current action.

9. The apparatus of claim 1, wherein the current action further comprises:
transmitting information related to a user of the mobile device to the third party.

10. The apparatus of claim 9, wherein the content of the information is determined by an association between the event and the third party.

11. An apparatus comprising:
a processor; and
memory coupled to the processor, the memory comprising executable instructions that when executed by the processor cause the processor to effectuate operations comprising:
determining a location of a mobile device;
predicting that an event has occurred based on:
the location of the mobile device;
a schedule associated with the mobile device; and
a profile associated with the mobile device, the profile comprising a previous action selected to handle the event;
selecting an action that can be performed in response to the predicted occurrence of the event based on the previous action, wherein the action differs from the previous action; and
performing the action.

12. The apparatus of claim 11, the operations further comprising:
transmitting an indication of the action to the mobile device; and
receiving an indication that the action was selected via the mobile device.

13. The apparatus of claim 11, the operations further comprising:
receiving, from the mobile device, an indication verifying that the event has occurred;
predicting that a sub-event has occurred based on the verified event; and
selecting at least one action that can be performed in response to the predicted occurrence of the sub-event.

14. The apparatus of claim 11, wherein performing the action comprises:
providing, from the mobile device to a remote device, a message related to the event.

15. The apparatus of claim 14, the operations further comprising:
providing, to a remote device, information related to the action.

16. The apparatus of claim 11, the operations further comprising:
modifying the schedule.

17. The apparatus of claim 16, the operations further comprising:
modifying a schedule associated with a remote device, wherein the modification is related to the event.

18. An apparatus comprising:
a processor; and
memory coupled to the processor, the memory comprising executable instructions that when executed by the processor cause the processor to effectuate operations comprising:
accessing a database comprising an indication of a plurality of events, wherein:

the plurality of events is associated with a mobile device; and
the profile comprises a previous action selected via the mobile device to handle a previous event;
predicting that an event in the database has occurred based on the profile;
determining an action to perform, wherein;
the action is associated with the predicted occurrence of the event; and
the action differs from the previous action; and
performing the action.

19. The apparatus of claim 18, wherein the predicted event is based in part on a location of the mobile device.

20. The apparatus of claim 18, wherein the predicted event is based in part on a schedule associated with the mobile device.

* * * * *